United States Patent [19]
Casper et al.

[11] Patent Number: 6,075,634
[45] Date of Patent: Jun. 13, 2000

[54] GIGABIT DATA RATE EXTENDED RANGE FIBER OPTIC COMMUNICATION SYSTEM AND TRANSPONDER THEREFOR

[75] Inventors: Paul W. Casper; James W. Toy; Marc Sawyer, all of Melbourne, Fla.

[73] Assignee: JDS Uniphase Corporation, UBP, Melbourne, Fla.

[21] Appl. No.: 09/129,664

[22] Filed: Aug. 5, 1998

[51] Int. Cl.[7] .................................................. H04B 10/00
[52] U.S. Cl. ........................................... 359/152; 359/179
[58] Field of Search ..................................... 359/152, 143, 359/158, 173, 179

[56] References Cited

U.S. PATENT DOCUMENTS

| | | | |
|---|---|---|---|
| 4,554,673 | 11/1985 | Stevens | 359/152 |
| 4,703,471 | 10/1987 | Fitelson et al. | 359/152 |
| 5,410,600 | 4/1995 | Toy | 380/9 |
| 5,550,864 | 8/1996 | Toy et al. | 375/293 |
| 5,754,577 | 5/1998 | Casper et al. | 372/38 |

OTHER PUBLICATIONS

Single Page Article Entitled: "FLX–1000 Optical Link Extender", Link Extenders, Finisar Home.

*Primary Examiner*—Kinfe-Michael Negash
*Attorney, Agent, or Firm*—Charles E. Wands

[57] ABSTRACT

A fiber optic digital communication system and associated transponder architecture interfaces Gigabit Ethernet digital data over an extended range fiber optic link (e.g. upwards of 30 to 100 km), using digital data signal regeneration and optical signal processing components, that pre- and post-compensate for distortion and timing jitter, and thereby ensure accurate regeneration of the data at the far end of the extended distance fiber optic link. Regeneration in both the transmit and receive paths compensates for signal degradation resulting from the very substantial 'long haul' fiber distance between transponder sites, and timing jitter customarily present in low cost short haul fiber optic transceiver components. A high speed, low jitter, limiting current driver drives a distributed feedback laser, minimizing jitter generation, and optimizing range extension margin.

17 Claims, 2 Drawing Sheets

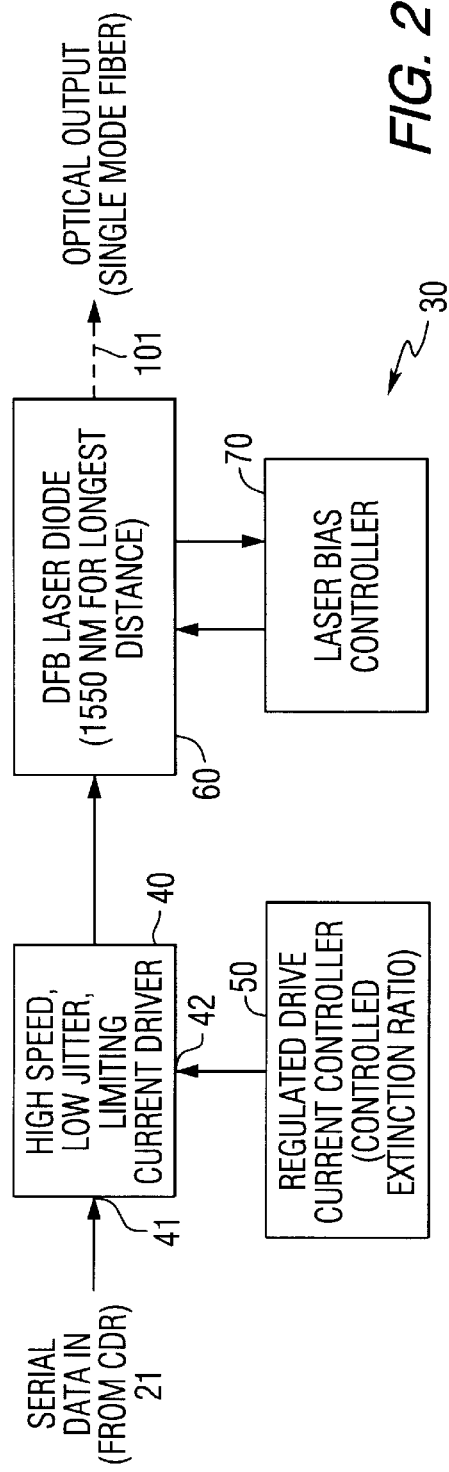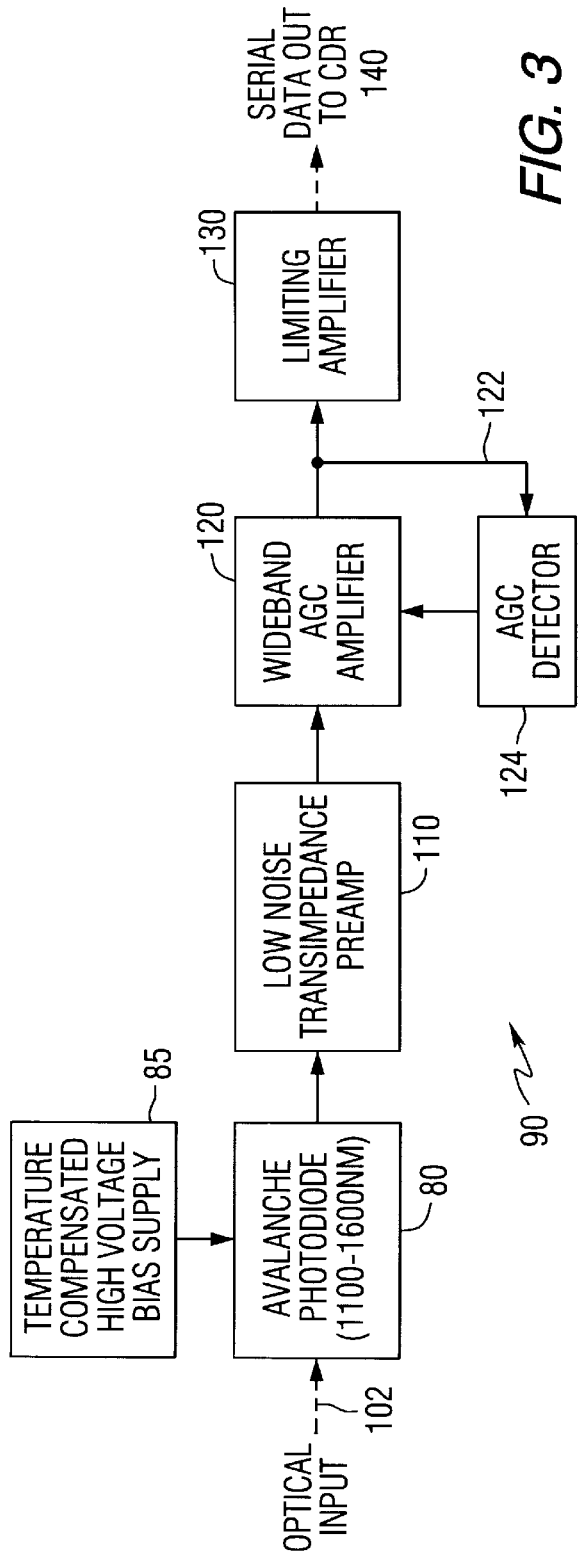

GIGABIT DATA RATE EXTENDED RANGE FIBER OPTIC COMMUNICATION SYSTEM AND TRANSPONDER THEREFOR

FIELD OF THE INVENTION

The present invention relates in general to communication systems, and is particularly directed to a new and improved, extremely high data rate (e.g. in the gigabits per second data range) fiber optic digital communication system and associated transponder architecture, which is configured to interface digital data over an extended range fiber optic link (e.g. upwards of 30 to 100 km), or well beyond the 5 km limit of local area networks.

BACKGROUND OF THE INVENTION

Because their wide spectral characteristics allow a user to transport broadband signals, and offer considerable flexibility in the choice of data rates for serialized digital data, fiber optic (digital) communication systems are now preferred over and are being installed to replace a variety of conventional metallic cable networks. However, at relatively high data rates (e.g. those above several hundred Mb/s to one Gb/s or higher), the limited performance capabilities of readily available and reduced cost electronic circuits and components has limited the end-to-end link distance (of what is commonly referred to in the communications industry as "(802.3 z) Gigabit Ethernet") to essentially that of a local area network, covering a distance of on the order of 5 km or less.

Where transport over long haul distances (considerably in excess of 5 km) is desired, it has been customary practice to require a signal protocol conversion (e.g., from Ethernet to a synchronous optical network (SONET) based system), which is cost-prohibitive to most LAN customers. Still, as telecommunication customers are increasingly relying upon the rapid information access and transport capabilities of digital communication networks, it has become apparent to many if not most service providers of the need to extend the range of high speed data communications to distances well beyond that of local area network, but in a manner that is both transparent and cost acceptable to the end user.

SUMMARY OF THE INVENTION

In accordance with the present invention, this objective is successfully achieved by a new and improved, extremely high data rate full duplex fiber optic communication system and transponder architecture employed therein, which is configured to interface high speed (e.g., Gigabit Ethernet) digital data over an extended range link (e.g. upwards of 30 to 100 km), which is well beyond the capability of present day local area network-standardized fiber optic transport systems.

The fiber optic transponder of the present invention includes a front end (short haul) transceiver unit that contains an opto-electronic converter-receiver and an associated electro-optic converter transmitter. The front end's opto-electronic converter-receiver is coupled to an optical fiber of a local area network, through which gigabit digital data that is to be transported over a long distance fiber optic link for delivery to a recipient customer site is supplied. While the LAN fiber may be either multimode or single mode, the long distance fiber is a single mode fiber, such as single mode 1310 nm fiber (or a single mode 1550 nm fiber for longest distance transport). The electro-optic converter-transmitter unit is operative to convert electrical signals that have been regenerated from long distance optical data received from a far end site into optical signals for delivery to the LAN.

To compensate for signal degradation resulting from the very substantial 'long haul' fiber distance between transponder sites, and the timing jitter customarily present in low cost short haul fiber optic transceiver components, the output of the front end's opto-electronic converter-receiver is reshaped and retimed into a highly precise serial data signal by a clock recovery-based transmitter regenerator unit. The transmitter regenerator unit derives a synchronous, low-jitter clock for retiming the Gigabit Ethernet data and removing all amplitude noise. The resulting serialized data signal stably and precisely replicates the original Gigabit Ethernet—removing any degradation that may be present in the signal received by the opto-electronic converter-receiver, so that its amplitude and shape are optimally square wave representative, and with minimum or no timing jitter. This effectively jitterless, vertical fall and rise time-shaped serial data stream signal is coupled as a data drive input to a highly stable output optical transmitter.

The output optical transmitter preferably includes a high speed, low jitter, limiting current driver, which minimizes jitter generation, and thereby optimizes range extension margin. Hard limiter circuitry within the current driver additionally functions to 'square up' the serial data stream, producing a highly stable peak-to-peak laser drive current signal that is independent of any input amplitude variations. The current driver is controlled by a regulated drive current controller to ensure that the output extinction ratio of an optical output generator (laser diode) is settable precisely and remains highly stable, thereby minimizing wavelength chirp, so as to prevent undesirable dispersion effects through a dispersive, long fiber. To minimize potential dispersion effects of a non-dispersion-shifted optical fiber which is used for the long distance fiber link, the laser diode transmitter is preferably configured as a distributed feedback laser unit, having a narrow spectral width, whose output wavelength corresponds to that point of the spectral characteristic of the material of the long distance optical fiber where attenuation is minimum.

The receive end from the long distance fiber optic link from the far end site is coupled to an avalanche photodiode detector of a long distance opto-electronic converter-receiver, which is operative to convert incoming optical data signals from a complementary transponder at the far end site into electrical signals representative of the high precision Ethernet formatted data sourced from a customer served by the far end site. In order to compensate for the expected attenuation and dispersion-induced optical waveform distortion in the received signal, the photodiode detector preferably has sensitivity optimally responsive to the wavelength of the far-end transmitter, and bandwidth in excess of that customary for the bit rate. The detector's photocurrent signal is converted to a voltage waveform by a low noise transimpedance preamplifier, the output of which is coupled through a wideband AGC amplifier to a voltage limiting amplifier, which outputs a serialized data stream.

The output of the voltage limiting amplifier is coupled to a receiver regenerator unit, which removes amplitude distortion and timing jitter that have been introduced into the received optical signal in the course of data transport over the long distance fiber from the far end site. Like the transmitter regenerator unit, the receiver regenerator unit contains clock recovery-based data regeneration circuitry, which outputs an electrical output signal that stably replicates the Gigabit Ethernet data modulations of the optical signal received by the long distance opto-electronic converter-receiver. The regenerated Gigabit Ethernet output of the receiver regenerator is coupled to the short haul electro-optic converter-transmitter unit of the transponder's front end for application to the LAN.

BRIEF DESCRIPTION OF THE DRAWINGS

FIG. 1 diagrammatically illustrates the architecture of a full duplex fiber optic transponder for extended range transport of Gigabit Ethernet data;

FIG. 2 diagrammatically illustrates the configuration of a long distance electro-optic transmitter employed in the transponder architecture of FIG. 1;

FIG. 3 diagrammatically illustrates the configuration of a long distance opto-electronic receiver employed in the transponder architecture of FIG. 1.

DETAILED DESCRIPTION

Figure 4:
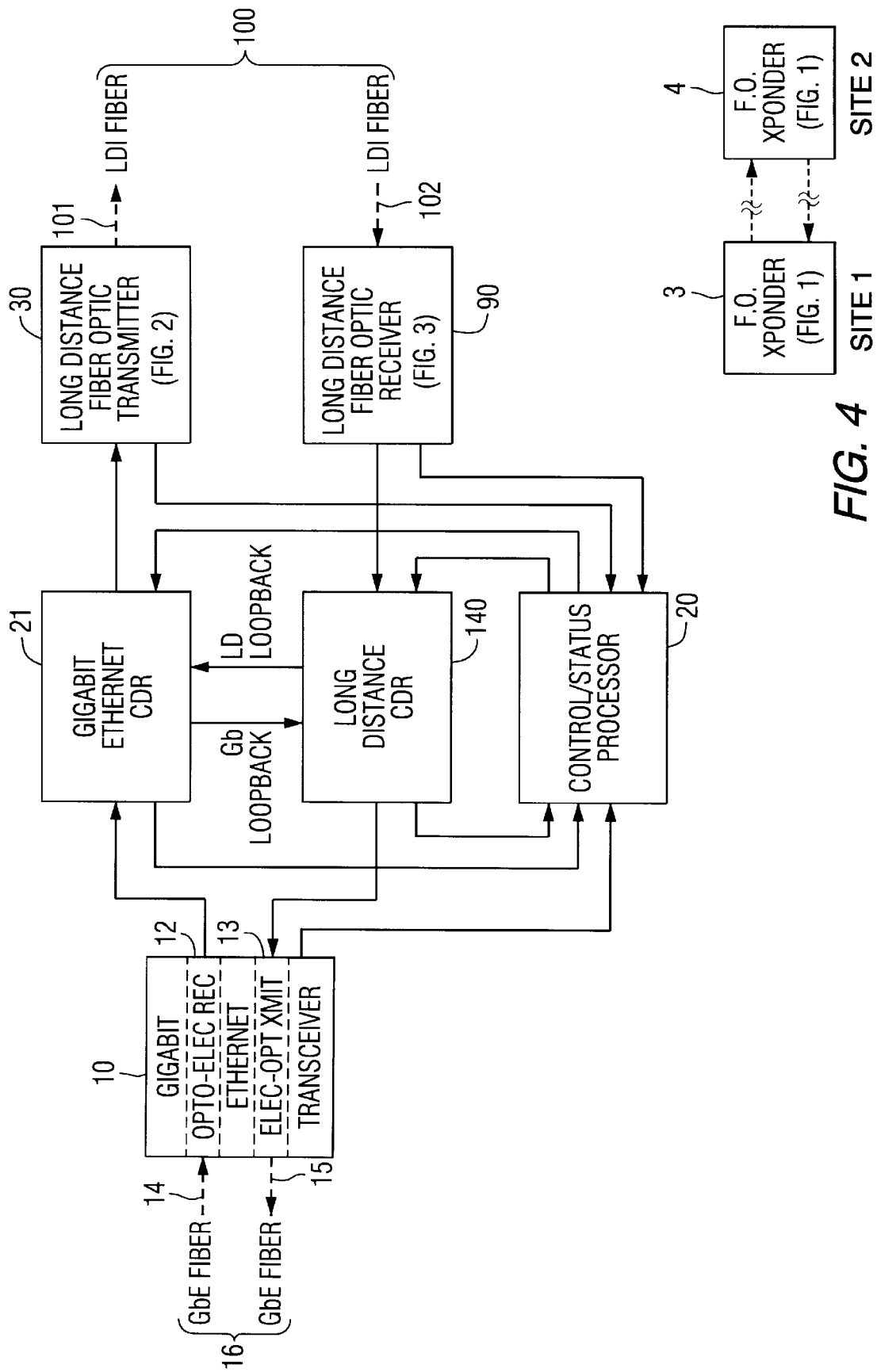
FIG. 4 shows first and second transponder sites containing the transponder of FIG. 1 for extended range transport over a long distance fiber optic pair.

Before describing in detail the extended range fiber optic transponder architecture of the present invention, it should be observed that the invention resides primarily in what is effectively a prescribed arrangement of conventional (opto-electronic, electro-optic) communication circuits and components and an associated supervisory digital signal processor, that controls the operation thereof. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of a fiber optic transponder architecture in a convenient functional grouping, whereby the present invention may be more readily understood.

The architecture of a full duplex transponder for interfacing a short haul high speed fiber optic data link, such as a Gigabit Ethernet (GbE) LAN, with a long distance fiber optic link, in accordance with a non-limiting, but preferred embodiment of the present invention will now be described with reference to the diagrammatic illustrations of FIGS. 1–4. As shown in FIG. 1, for interfacing with a short haul link, such as a local area network or LAN, the transponder has a front end that includes a standard Gigabit Ethernet transceiver 10 (such as a Hewlett-Packard Model No. HFBR-5305 transceiver as a non-limiting example) coupled (via suitable optical fiber couplers, not shown) to an optical fiber pair 14/15 of a LAN 16. Transceiver 10 and other components of the transponder to be described are coupled to a control and status monitoring processor 20.

The LAN provides incoming customer-sourced gigabit digital data (having a 1.25 Gb/s data rate, as a non-limiting example) to be transported over an outgoing optical fiber 101 of a long distance fiber optic link pair 100, shown in FIG. 4 as extending from a first site 1, where the transponder 3, configured as shown in FIG. 1, is located, to a companion extended range fiber optic transponder 4, also configured as shown in FIG. 1, at the far end or second, data delivery site 2 of that link. As a non-limiting example, each of the pair of optical fibers 101 and 102 of the optical fiber link pair 100 may comprise a commercially available single mode, zero-dispersion fiber, such as, but not limited to a Corning SMF-28 single mode 1310 nm zero-dispersion fiber. Alternatively, for maximum distance transport, a single mode 1550 nm standard or dispersion-shifted fiber may be used.

In the outgoing direction (from the LAN), the front end of the transceiver 10 contains a (short haul) opto-electronic converter-receiver 12, the input of which is coupled to a first, incoming section of optical fiber 14 of a LAN 16. Opto-electronic converter-receiver 12 is operative to convert incoming optical data signals supplied over in incoming optical fiber 14 into electrical signals that are representative of the Ethernet formatted customer data. As pointed out above, the optical fiber of such a standard (short haul—e.g., 5 km or less) LAN is typically either multimode or single mode fiber, such as that configured for operation at 850 nm or 1310 nm.

The front transceiver 10 also includes a (short haul) electro-optic converter-transmitter unit 13, the output of which is coupled to a second or outgoing section of optical fiber 15 of the LAN 16. The electro-optic converter-transmitter unit 13 is operative to convert electrical signals that have been regenerated from light signals modulated with (Gigabit Ethernet formatted) data that has been transported over an incoming fiber 102 of the long distance fiber optic link 100 from the far end site into optical output signals for delivery to the LAN 16.

Because of the very substantial 'long haul' distance between transponder sites (e.g., up to 100 km), and the timing jitter of low cost short haul transceiver components, the modulated light signal transported by the long distance fiber optic link 100 can be expected to undergo significant and unacceptable (amplitude, signal shape and timing) degradation by the time it reaches the far end of the link. As a consequence, in order to optimize the accuracy to which the original data signal is recovered at the far end of the link, it is critical that the optical signal launched by the transponder be as 'pristine' or pure as possible in terms of amplitude, rise and fall times, jitter and signal-to-noise ratio. Namely, in order to achieve maximum distance transport, it is essential that the signal launched into the outgoing long distance optical fiber 101 be effectively free of timing and amplitude corruption.

For this purpose, rather than simply directly interface the received Gigabit Ethernet electrical data stream output by the opto-electronic converter-receiver 12 to an electro-optic transmitter for application to the long distance fiber 100, the data stream is retimed and reshaped into an effectively non-corrupted or non-degraded signal by means of a transmitter regenerator unit 21. As pointed out earlier, the use of a clock/data regenerator (CDR) in both the transmit and receive paths in combination with precision controlled optical signal processing components, serves to pre- and post-compensate for distortion and timing jitter, and thereby ensure accurate regeneration of the data at each end of the extended distance link. This obviates the need to install what would otherwise be complex and costly protocol conversion equipment, such as a SONET-based system.

As a non-limiting example, the transmitter regenerator (or Gigabit Ethernet CDR) unit 21 may comprise a conventional clock recovery-based data regeneration circuit chip, such as an AMCC Model No. S2058A, which is operative to derive a synchronous, low-jitter clock that retimes the incoming data stream (here, the customer's Gigabit Ethernet data) and removes all amplitude noise. What results is a (to-betransmitted) serialized data stream that stably and faithfully replicates data modulations of the original serialized data stream contained in the Gigabit Ethernet signal transported over the LAN fiber and received by the front end opto-electronic converter-receiver 12. The amplitude and shape of this regenerated serialized data stream, which has minimum timing jitter, are optimally square wave representative. Namely, the regenerated signal has an optimally open eye pattern of maximum amplitude and minimal rise and fall time.

The highly precise and jitterless serial data stream signal produced by the transmitter regenerator 21 is coupled as a data drive input to a long distance or output optical transmitter 30, diagrammatically illustrated in FIG. 2 as comprising a high speed, low jitter, limiting current driver 40 having an input 41 that is coupled to receive the regenerated data signal. As pointed out earlier, the use of a high speed current driver serves to minimize jitter generation, thereby optimizing range extension margin. For the non-limiting example of a 1.25 Gb/s Ethernet data stream, current driver 40 may have an operational bandwidth of 2.5 Gb/s. Incorporating hard limiter circuitry within the laser current driver functions to 'square up' the signal to be transmitted, producing a highly stable peak-to-peak laser drive current signal that is independent of amplitude variations in the input signal. Current driver 40 has a control input 42 coupled to a regulated drive current controller 50, which ensures that the output extinction ratio of a downstream driven laser diode 60 is precisely set and highly stable, thereby achieving minimal wavelength chirp (which might otherwise create undesirable dispersion effects) of the laser's output beam.

In order to minimize potential dispersion effects with a non-dispersion-shifted optical fiber (such as a Corning SMF-28 single mode 1310 nm zero-dispersion fiber), laser diode 60 is preferably configured as a distributed feedback (DFB) laser unit, that includes an associated laser bias controller 70. As a non-limiting example, such a DFB-based laser unit may be of the type described U.S. Pat. No. 5,754,577, by P. Casper et al. The laser diode itself preferably has a narrow spectral width, whose output wavelength (e.g., 1310 nm or 1550 nm) corresponds to that point of the spectral characteristic of the material of the long distance optical fiber 101 where attenuation is minimal. The output of laser 60 is coupled to the fiber 101 by way of a suitable optical coupler, not shown.) As noted earlier, current commercially available optical fibers suitable for long distance applications of the type described here include single mode 1310 nm and 1550 nm optical fibers.

As shown in detail in FIG. 3, the receive end of the incoming fiber 102 of the long distance fiber optic link 100 from the far end site is coupled (via an optical coupler, not shown) to an avalanche photodiode detector 80 of a long distance opto-electronic converter-receiver 90, such as a Model No. 54RC, manufactured by Broadband Communication Products. The long distance opto-electronic converter-receiver 90 converts incoming optical data signals supplied over the section of long distance optical fiber 102 into electrical signals representative of the Ethernet formatted customer data that has been regenerated by an associated transponder at the far end site. As noted above, for a long distance fiber optic link, in the return or receive direction from the far end transponder, it can be expected that the signal will be substantially attenuated and may exhibit dispersion-induced optical waveform distortion.

To compensate for this signal degradation, the photodiode detector 80 may comprise an InGaAs photodiode detector having a relatively narrowband sensitivity (e.g., in a range of 1100–1600 nm, which encompasses the 1310 nm and 1550 nm windows of the long distance fibers of the present example), which is biased by a temperature compensated high voltage supply 85. The detected photo current signal generated by the photodiode detector 80 is amplified by means of a low noise transimpedance preamplifier 110 and coupled through a wideband automatic gain control (AGC) amplifier 120 (that includes an AGC feedback loop 122 through an AGC detector 124) to a limiting amplifier 130, which outputs a serialized data stream. The output of the amplifier 130 is coupled to a receiver regenerator unit (or long distance clock/data regenerator) 140, which compensates for amplitude distortion and timing jitter introduced into the received optical signal.

For this purpose, like the transmitter regenerator unit 21 described above, the receiver regenerator unit 140 contains clock recovery-based data regeneration circuitry, which outputs an electrical output signal that stably replicates the Gigabit Ethernet data modulations of the optical signal received by the long distance opto-electronic converter-receiver 90. A loopback path, that is controllably established by the control/status processor, may also be provided between the two (transmitter and regenerator) units. As in the case of the transmitter regenerator 21, this regenerated, minimum jitter output signal has a waveform that is optimally large/open eye pattern—square wave, so that the drive signal input to electro-optic converter-transmitter unit 13 will be of highest quality for application to the optical fiber 15 of the LAN 16.

As will be appreciated from the foregoing description, the desire of digital communication service providers, such as those supplying high speed (Gigabit Ethernet) LAN service, to extend their customers' service range to distances well beyond that of a local area network, without the complexity and cost of having to install a protocol conversion system, such as a SONET-based architecture, is effectively achieved in accordance with the present invention by a prescribed combination of digital data regeneration and optical signal processing components, that both pre- and post-compensate for distortion and timing jitter, and thereby ensure accurate regeneration of the data at the receive end of the extended distance link.

Regeneration in both the transmit and receive paths compensates for signal degradation resulting from the very substantial 'long haul' fiber distance between transponder sites, and timing jitter customarily present in low cost short haul fiber optic transceiver components. The regenerated serialized data signal stably and precisely replicates the original Gigabit Ethernet signal—absent any degradation that may be present in the signal, so that its amplitude and shape are optimally square wave representative and have minimum timing jitter.

The use of a high speed, low jitter, limiting current driver to drive a distributed feedback laser minimizes jitter generation, and optimizes range extension margin. It also functions to sharpen or square up the serial data stream, producing a highly stable peak-to-peak laser drive current signal that is independent of amplitude variations. The regulated drive current controller ensures that the output extinction ratio of the laser is highly stable, thereby minimizing wavelength chirp, and preventing undesirable dispersion effects in the laser's output beam. The distributed feedback laser has its output wavelength set at that point of the spectral characteristic of the material of the long distance optical fiber where attenuation is minimum. The laser also has a narrow spectral width that minimizes potential dispersion effects of the non-dispersion-shifted optical fiber of the long distance fiber link.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. A fiber optic communication transceiver comprising:
   a first opto-electronic receiver, which is coupled to receive an incoming optical signal modulated in accordance with a first information signal, and being operative to output a first electrical signal representative thereof;
   an outgoing signal and timing regenerator, which is coupled to receive said first electrical signal output by said first opto-electronic receiver and producing therefrom a second electrical signal that regenerates amplitude and timing of said first information signal; and
   a laser transmitter coupled to receive said second electrical signal produced by said outgoing signal regenerator, and operative to generate an output light signal in accordance with said second electrical signal, said output light signal containing data modulations of said information signal that are effectively free of timing jitter and amplitude noise;
   a first single mode optical fiber, coupled to said laser transmitter at a first site, and being operative to transport said output light signal generated thereby to a second site;
   a second single mode optical fiber, over which an incoming light signal from said second site is transported to said first site;
   a second opto-electronic receiver, which is coupled to receive said incoming light signal, and being operative to output a third electrical signal representative of said incoming light signal from said second site;
   an incoming signal regenerator, which is coupled to receive said third electrical signal output by said second opto-electronic receiver and producing therefrom a fourth electrical signal that regenerates amplitude and timing of a second information signal contained in said third electrical signal; and
   an electro-optic transmitter, which is coupled to receive said fourth electrical signal produced by said incoming signal regenerator, and is operative to generate an output optical signal in accordance with said fourth electrical signal; and wherein
      said laser transmitter comprises a laser current driver, which is operative to drive a distributed feedback laser with a controlled extinction ratio drive current in accordance with, but independent of amplitude variations in, said second electrical signal produced by said outgoing signal regenerator.

2. A fiber optic communication system according to claim 1, wherein said incoming optical signal has an optical center wavelength less than that of said first single mode optical fiber.

3. A fiber optic communication system according to claim 1, wherein said first and second single mode optical fibers have an optical center wavelength of at least 1310 nm.

4. A fiber optic communication system according to claim 1, wherein said first information signal is a Gigabit Ethernet digital data signal.

5. A fiber optic communication system comprising:
   at a first site,
      a first opto-electronic receiver, which is coupled to receive a first incoming optical signal containing first digital data, and being operative to output a first electrical digital data signal representative thereof;
      a first outgoing data signal regeneration and clock recovery unit, which is coupled to receive said first electrical digital data signal, and recovering a data clock embedded therein, so as to produce therefrom a second electrical digital data signal that regenerates data and timing of said first digital data; and
      a first laser transmitter, which is coupled to receive said second electrical digital data signal produced by said first outgoing data signal regeneration and clock recovery unit, and generating a first output light signal modulated in accordance with said second electrical digital data signal;
   a first single mode optical fiber, coupled to said first laser transmitter, and being operative to transport said output light signal generated thereby to a second site;
   at said second site,
      a second opto-electronic receiver, which is coupled to said first single mode optical fiber, and is operative to produce a third electrical digital data signal representative of said first output light signal transported from said first site;
      a first incoming data signal regeneration and clock recovery unit, which is coupled to said second opto-electronic receiver, and is operative to recover an embedded data clock, to produce a fourth electrical digital data signal that regenerates data and timing of said first digital data; and
      a first electro-optic transmitter, which is coupled to receive said fourth electrical digital data signal produced by said first incoming data signal regeneration and clock recovery unit, and is operative to generate a first output optical signal containing said first digital data; and further including
   at said second site,
      a third onto-electronic receiver, which is coupled to receive a second incoming optical signal containing second digital data, and being operative to output a fifth electrical digital data signal representative thereof,
      a second outgoing data signal regeneration and clock recovery unit, which is coupled to receive said fifth electrical digital data signal, and recovering a data clock embedded therein, so as to produce therefrom a sixth electrical digital data signal that regenerates data and timing of said second digital data; and
      a second laser transmitter, which is coupled to receive said sixth electrical digital data signal produced by said second outgoing data signal regeneration and clock recovery unit, and generating a second output light signal modulated in accordance with said sixth electrical digital data signal;
   a second single mode optical fiber, coupled to said second laser transmitter, and operative to transport the output light signal generated thereby to said first site;
   at said first site,
      a fourth opto-electronic receiver, which is coupled to said second single mode optical fiber, and is operative to produce a seventh electrical digital data signal representative of said second output light signal transported from said second site;
      a second incoming data signal regeneration and clock recovery unit, which is coupled to said second opto-electronic receiver, and is operative to recover an embedded data clock, to produce an eighth electrical digital data signal that regenerates data and timing of said second digital data; and a second electro-optic transmitter, which is coupled to receive said eighth electrical digital data signal Produced by said second incoming signal regenerator, and is operative to generate a second output optical signal containing said second digital data.

6. A fiber optic communication system according to claim 5, wherein said first and second sites are spaced apart from one another by a distance greater than 5 km.

7. A fiber optic communication system according to claim 5, wherein said first and second sites are spaced apart from one another by a distance of at least 30 km.

8. A fiber optic communication system according to claim 5, wherein first and second laser transmitters comprise first and second laser current drivers, which are operative to drive respective first and second distributed feedback lasers with first and second controlled extinction ratio drive currents in accordance with, but independent of amplitude variations in, said second and sixth electrical signals, respectively.

9. A fiber optic communication system according to claim 5, wherein said first and second incoming optical signals have an optical center wavelength less than that of light transported by said first and second optical fibers.

10. A fiber optic communication system according to claim 5, wherein said first and second optical fibers have an optical center wavelength of at least 1310 nm.

11. A fiber optic communication system according to claim 5, wherein said first and second digital data comprise Gigabit Ethernet digital data signals.

12. A fiber optic communication apparatus comprising:

a first opto-electronic converter, which is operative to output a first electrical signal representative of an incoming optical signal that has been modulated in accordance with first digital data;

a transmitter regenerator unit, coupled to said first opto-electronic converter, and being operative to produce a second electrical signal that replicates modulations of said incoming optical signal by said first digital data, such that said modulations are absent degradation that would prevent recovery at a second site, spaced apart from said transceiver by a distance greater than five kilometers, of said first digital data contained within an outgoing light signal produced by a narrow spectral width distributed feedback laser and transmitted over a long distance single mode optical fiber to said second site; and a distributed feedback laser transmitter, coupled to said transmitter regenerator unit, and being operative to generate an output light signal over said first long distance single mode optical fiber to said second site in accordance with said second electrical signal, said single mode optical fiber being coupled to said distributed feedback laser transmitter.

13. A fiber optic communication apparatus according to claim 12, further comprising:

a second opto-electronic converter, which is coupled to a second long distance single mode optical fiber from said second site, and is operative to output a third electrical signal representative of a light signal received from said second site;

a receiver regenerator unit, which is coupled to said second opto-electronic receiver and is operative to produce a fourth electrical signal that regenerates timing and second site information signal modulations contained in said third electrical signal; and an electro-optic converter, coupled to said receiver generator, and being operative to generate an output optical signal in accordance with said fourth electrical signal.

14. A fiber optic communication apparatus according to claim 12, wherein said distributed feedback laser transmitter comprises a laser current driver, which is operative to drive a distributed feedback laser with a controlled extinction ratio drive current in accordance with, but independent of amplitude variations in, said second electrical signal produced by said transmitter regenerator unit.

15. A fiber optic communication apparatus according to claim 12, wherein said incoming optical signal has an optical center wavelength less than that of light transported by said first single mode optical fiber.

16. A fiber optic communication apparatus according to claim 15, wherein said first and second single mode optical fibers have an optical center wavelength of at least 1310 nm.

17. A fiber optic communication apparatus according to claim 12, wherein said digital data comprises a Gigabit Ethernet digital data signal.

* * * * *